June 6, 1950 L. F. CARTER 2,510,068
GYROCOMPASS
Filed Jan. 31, 1945 3 Sheets-Sheet 1
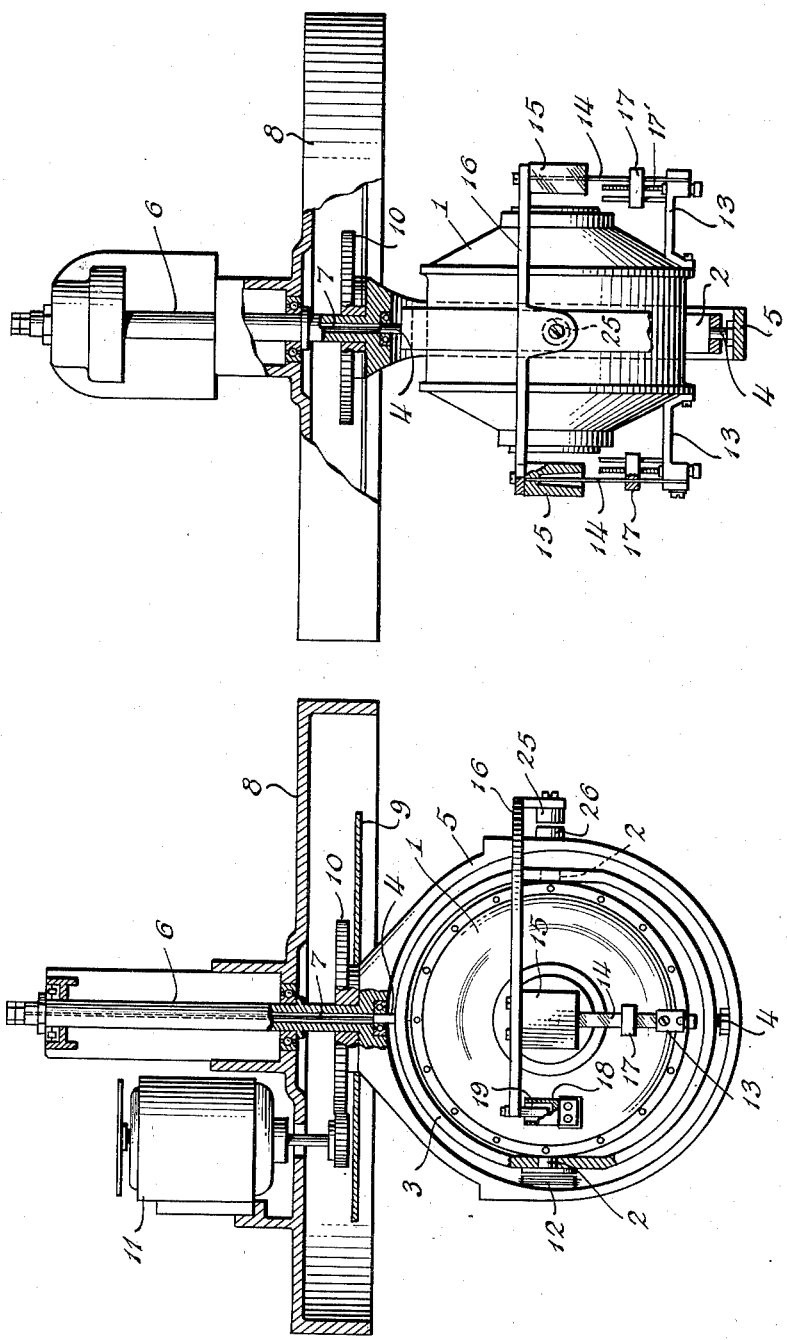
INVENTOR
LESLIE F. CARTER
BY
Herbert H. Thompson
his ATTORNEY

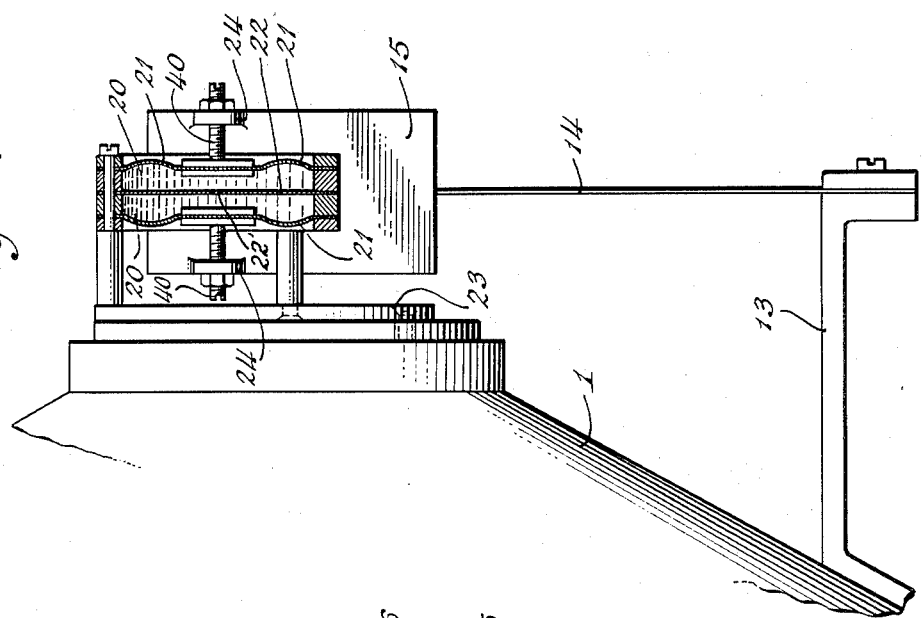
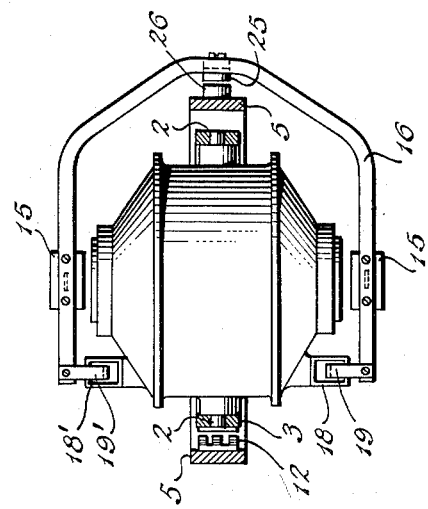

June 6, 1950     L. F. CARTER     2,510,068
GYROCOMPASS
Filed Jan. 31, 1945     3 Sheets-Sheet 3
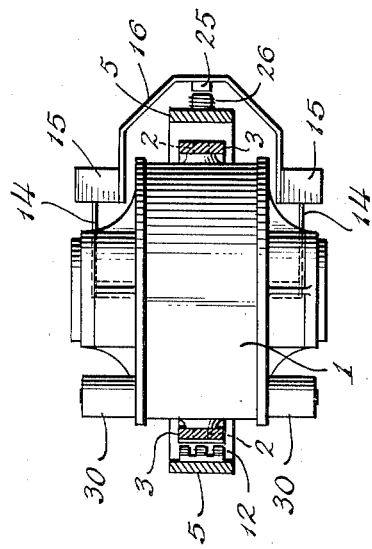
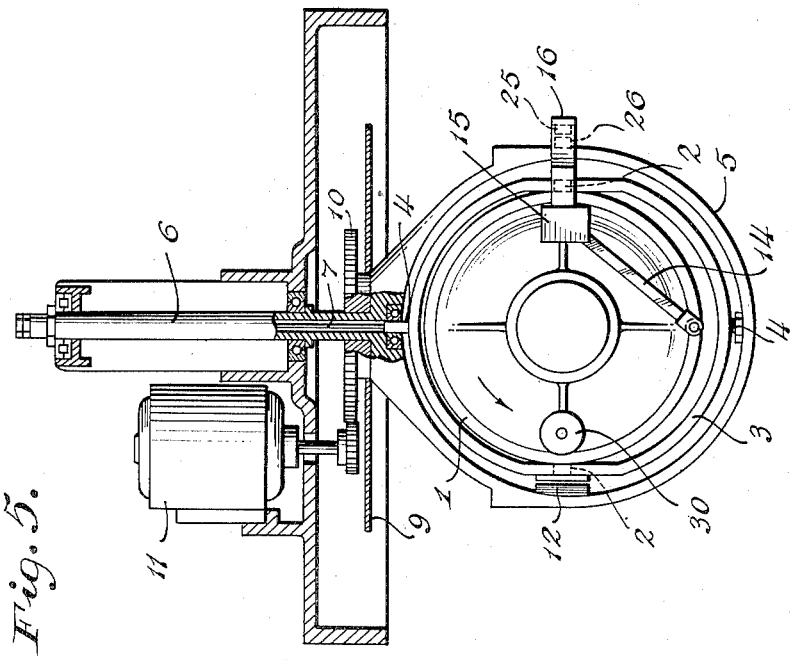
INVENTOR
LESLIE F. CARTER
BY Herbert H. Thompson
ATTORNEY Patented June 6, 1950

2,510,068

UNITED STATES PATENT OFFICE 2,510,068

GYROCOMPASS

Leslie F. Carter, Leonia, N. J., assignor to The Sperry Corporation, a corporation of Delaware Application January 31, 1945, Serial No. 575,450

13 Claims. (Cl. 33—226)

This invention relates to gyroscopic compasses of the kind in which a gyroscope is mounted in a state of substantially unstable equilibrium, but is made north-seeking upon tilt by a gravitationally responsive member in the form of a shifting mass, which shifts the center of gravity of the gyroscope to one side of the E-W horizontal axis. The object of the invention is to improve and simplify the gravity torque-producing means which acts upon tilt of the gyroscope, and to reduce the number of moving parts and bearings, and to minimize friction.

The majority of gyrocompasses at present in use have a gyroscope which is arranged for operation with the axle normally horizontal or nearly so. Meridian seeking properties are imparted by some form of gravitational control usually obtained by making the gyroscope pendulous in the broad sense, by which it is intended to include either pendulousness or anti-pendulousness. The latter form is at present the more popular, the gyroscope being mounted in unstable equilibrium with the rotor spinning counterearthwise, that is, in a clockwise direction as seen from the north end of the compass.

The antipendulous property might be obtained simply by mounting the gyroscope with the center of gravity above the point of suspension, but as this arrangement inevitably leads to serious deviations when the compass swings in a rolling ship, particularly on intercardinal courses, the gyroscope itself is mounted in neutral equilibrium and the antipendulous property is now usually obtained by the use of liquid, generally mercury, contained in an elongated U-shaped tube attached to and tilting with the gyroscope, so that the liquid flows to the lower end on any inclination of the gyro axle. The displaced liquid in prior compasses then applies a gravity couple round the horizontal diameter of the gyro casing which renders the apparatus north-seeking.

In the most common form of gyrocompass, the aforesaid liquid ballistic is pivoted on the phantom ring and connected to the gyro casing at one point. Such construction usually requires two horizontal bearings to support the ballistic on the phantom ring. In addition, the restrictions employed in the U-shaped tube to lessen intercardinal rolling error sometimes interfere with the liquid levelling itself in the tube promptly which effect is additive to the friction in the above-mentioned pivotal bearings in interfering with accuracy.

According to my invention, I eliminate all such extra bearings and liquid ballistic troubles by mounting on the gyroscope a mass in unstable equilibrium and without any pivotal bearings. Preferably, such mass is in the form of an inverted pendulum bob supported on a leaf spring above the point of connection between the spring and casing so that the mass is displaced by an amount approximately proportional to the tilt of the gyroscope in a direction substantially parallel to the gyro axle and towards the lower end thereof whenever said axle is not horizontal. To prevent deviations of the compass from being caused by oscillation of the masses resulting from short period alternating accelerations, such as are produced by rolling of the ship, I damp or retard the displacement of the mass or masses by a viscous fluid damper to put the mass displacement out of phase with the compass swings.

Provision must also be made for the damping of the slow oscillations of the gyro axle in azimuth, and a further feature of my invention resides in the means adopted for producing the required damping effect. This effect is obtained by the introduction of a small couple around the vertical axis of the gyroscope, said couple being approximately proportional at all times to the small displacement of the controlling weight from the normal position which it occupies when the axle is horizontal. The damping couple at any moment is therefore substantially proportional to the rate at which the gyro axle is precessing in azimuth and the sense of the couple causes a further precession of the gyroscope in a direction to decrease the existing tilt. The damping couple therefore assists the precession of the gyroscope in azimuth.

Other objects and advantages will become apparent from the specification, taken in connection with the accompanying drawings wherein the invention is embodied in concrete form.

In the drawings,

Fig. 1 is a south elevation partly in section of one form of gyrocompass embodying my invention;

Fig. 2 is an east elevation of parts of the compass shown in Fig. 1;

Fig. 3 is a plan view, partly in section of parts of the compass shown in Fig. 1;

Fig. 4 shows an alternative form of viscous damper;

Fig. 5 shows an alternative form of resilient mounting in elevation; and

Fig. 6 is a plan view of the arrangement of Fig. 5.

Referring to Figs. 1, 2 and 3, the gyro rotor (not shown) is contained in the casing 1 supported on horizontal bearings 2, 2 in normally neutral equilibrium in a vertical ring 3, which ring is itself supported in vertical guide bearings 4, 4 in a phantom or follow-up ring 5. The phantom ring supports the weight of the gyroscope from the top of the tube 6 by a wire suspension 7 of the well known type. The phantom ring is mounted for rotation about a vertical axis in a spider 8 which is gimballed in the usual way. The phantom ring 5 carries the compass card 9 and an azimuth gear 10. A reversible electric motor 11 mounted on the spider is controlled by a sensitive controller or pick off 12 of the transformer type to make the phantom ring follow all the movements of the vertical ring in azimuth so that the vertical and phantom rings are always coplanar. Brackets 13, 13 fixed rigidly at the lower part of the gyro casing, carry upwardly extending flat leaf springs 14, 14 to the upper ends of which are attached heavy masses 15, 15 said masses being preferably coupled together by a rigid yoke piece 16 passing round from north to south, clear of the other parts of the machine. So long as the gyro axle is horizontal, the leaf springs are vertical and support the heavy masses as struts without bending, but on the occurrence of a small tilt of the gyroscope which inclines the springs from their normal vertical position, the masses bend the springs and are displaced with their connecting yoke towards the lower end of the axle, the displacement being magnified or exaggerated by the flexure of the springs, but remaining proportional to the tilt of the gyroscope for such small angles of tilt as occur in practice. The leaf springs are made stiff enough to bring the masses to a position of neutral equilibrium when the gyroscope is truly horizontal, but which renders the gyroscope antipendulous or unstable upon the slightest tilt of the gyroscope.

A very sensitive tilt responsive device is thus provided having no bearings and hence no bearing friction and yet having an appreciable N-S shift for small tilts of the gyro. This weight shift is kept in the N-S plane by the rigid connecting yoke 16 between masses 15 which acts as a parallel linkage. Improved sensitivity and accuracy is thereby secured since the accuracy of a gyrocompass is largely measured by the sensitivity of the gravitational controller to minute tilts of the gyroscope about its horizontal axis. In practice, such tilts seldom exceed a degree and should not exceed a minute, since the modern compass stays within less than a degree of the meridian. Hence, it is evident that any improvement in the sensitiveness to minute tilts results in improvement in the accuracy of the compass.

It is well known that for the most favorable operation of a gyro compass, the period of azimuthal oscillation without damping should be in the neighborhood of 85 minutes. Given a gyroscope of any suitable form and spun at a convenient speed, the period of oscillation of my improved compass will depend on the weight of the masses 15, 15 and on the stiffness of the springs 14 that support them; and the method of securing the correct combination to give the proper period of oscillation will be understood by those versed in the gyrocompass art.

In order to obtain the ideal period under all conditions, it is necessary to vary the effectiveness of the movable masses in different latitudes. This result may be obtained by varying the effective length of the leaf springs according to the latitude in which the compass is being used. The length may be varied, for instance, by the use of sliding blocks 17 having slits through which the springs pass, and adjustably attached to the gyro casing so that they can be raised or lowered; that part of the spring above the top surface of each block being alone operative. For this purpose each block is shown as threaded on a threaded shaft 17' each of which may be rotated for adjusting the height of its block. Scales (not shown) graduated according to the latitude may be fixed adjacent to each block to facilitate the setting. The sliding block will be lowered for high latitudes and raised for low latitudes so that at 70° latitude, for example, the displacement of the masses will be twice as great as at the equator for a given tilt of the gyroscope.

In order to prevent or damp out oscillations of the heavy masses on the leaf springs and also to avoid intercardinal rolling error, the movement of the masses is controlled by a pair of viscous liquid damping devices. Each damper consists of a small pot or tank 18, 18' with an open top attached rigidly to the gyro casing 1 and containing highly viscous oil or other liquid of like properties. A vertical blade 19, 19' attached to the yoke piece 16 dips into the viscous liquid whereby oscillations of the yoke and of the masses 15 on springs 14 are effectively damped. Although, I prefer to use these dampers in pairs as making a symmetrical arrangement, it will be clear that the same effect could be obtained with a single, more powerful damper of the same type.

An alternative form of damping device is shown in Fig. 4. This consists of two chambers 20, 20 with corrugated walls 21 of rubber or other flexible material, said chambers being separated by a partition 22 which is mounted on the side of the gyro casing 1 by bracket 23. The outer movable walls of the chambers are clamped between screws 40 in a connecting piece 24 which is fixed to one of the masses 15. The chambers are both filled with a viscous liquid, such as oil, and a small hole 22' is pierced through the intervening partition 22. Consequently, movement of the masses in a north-south direction can only take place as a result of transfer of oil from one chamber to the other through the hole. By choosing liquid of suitable viscosity, oscillations of the masses at periods up to about a quarter of a minute can be substantially eliminated while at the same time oscillations with a period of about one and one-half hours, such as are involved in the normal meridian-seeking motion of the gyro, are not substantially hindered. At the same time it is possible to choose such a value for the viscosity that accelerations due to changes in the northerly or southerly speed of the ship will displace the masses sufficiently to give the required ballistic deflection to the gyroscope.

For the damping of the oscillations of the compass in azimuth, I prefer to use a method similar to that disclosed in my copending application Serial No. 575,451 for Gyrocompasses, for producing a couple about the vertical approximately proportional to the displacement of the masses without involving any substantial couple around the horizontal axis. Claims to this damper per se are reserved for said other application. Such a damper is peculiarly adapted to the type of gyrocompass shown herein having a laterally movable mass or masses for imparting meridian seeking properties and I prefer to incorporate the damper on or as a unitary part of such masses, which combination is claimed herein, as well as the novel ballistic. For this purpose I mount a magnetic member or means, such as a permanent magnet 25 on the yoke piece 16 connecting the two masses, in such a position that it is normally on the line of the axis of the pair of horizontal bearings 2, 2. In a corresponding position on the phantom ring, I mount a second or complementary magnetic means, such as magnet 26 also on the line of the axis of the horizontal bearings 2, 2. So long as the masses are in their normal or zero position, the two magnets 25 and 26 are in line with one another, and as the adjacent poles are unlike the attraction between them applies no couple to the gyroscope, but only a radial pull. Moreover, since the magnet system is centered on the axis of the horizontal bearings 2, 2, relative rotation of the gyro casing and vertical ring or phantom ring about this axis does not directly cause any couple to be applied by the magnets to the gyro. When, however, the masses and the yoke piece are displaced toward the north or south, the magnetic attraction between the magnets has a component in a horizontal plane between the phantom ring on the one hand and the yoke 16 on the other. Since yoke 16 is supported by springs 14 on the gyro casing, this component is equivalent to a couple applied round the vertical axis of the gyro. By mounting the magnet on the east side of the gyroscope, as shown, this couple will be in the required sense to produce the necessary damping for any small tilt of the gyro axle in either direction. For normal damping, the couple round the vertical axis will be of the order of $\frac{1}{50}$ of the couple round the horizontal axis produced by the masses, and therefore will not substantially interfere with the action of this latter, though if an exact approximation to the 85 minute period is to be obtained, the masses must each be about 2% greater than would otherwise be necessary in order to make up for the magnetic pull of the damping device.

Alternatively and preferably, the magnetic means 25 and 26 may both be primary magnets mounted with like poles adjacent to one another in which case they will exert a mutually repelling, instead of attracting, force. When such repelling magnets are employed they should be placed on the west side of the gyroscope so that the damping couple may have the right sign, in which case they will add slightly to the couple round the horizontal produced by the masses 15. This arrangement has the distinct advantage of sensitizing the response of the ballistic masses 15 to small gyro tilts, thus giving a higher degree of compass accuracy. On the other hand, using attracting magnets on the east side of the compass has the opposite effect so that the compass is more likely to have a continuous small amplitude oscillation about the meridian instead of settling accurately thereon. The masses may also be of somewhat less magnitude in the preferred form of my invention.

The use of repelling magnets at 25, 26 also possesses a further advantage since the direction of the torque exerted between the phantom and the gyroscope upon relative displacement in azimuth is in a direction to oppose the slight centralizing torque exerted by the so-called wire or torsion suspension 7 on this sensitive element, thus further reducing disturbing torques about the vertical axis. This de-centralizing action of the magnets also comes into play during a continuous turn of the ship when phantom 5 tends to lag behind the vertical ring 3 by a small angle in order to generate the follow-up signal actuating the azimuth motor 11. Under this condition, the centralizing torque due to the twisting of the suspension wire 7 is opposed by the de-centralizing torque of the magnets, since at that time not only is there a slight displacement between the vertical ring and phantom, but also the masses 15 are displaced by the acceleration force due to the turn in a direction to increase the displacement between the magnet elements 25, 26.

Although one or both of the magnetic members on the phantom ring and yoke piece may conveniently be made as permanent magnets, I may arrange either member, or both as an electromagnet with a soft iron core capable of being energized or deenergized at will. As is well known, all gyrocompass damping devices cause a small deviation to occur after considerable changes in the northerly speed of the ship, and for this reason it is customary to provide means to eliminate the damping effect while changes of speed and course are actually in progress. As explained in my aforesaid copending application, such elimination may not be necessary with my novel magnetic damper, but may be very simply effected in my damping device when an electromagnet is used on the phantom ring, as shown in Figs. 5 and 6, since the current energizing the magnet on the phantom is simply cut off either by hand or by an automatic switch responsive to turns or change of speed, while such changes are in progress. One method of obtaining this result is disclosed for instance in Patent No. 1,730,967, for Turning error preventer for gyrocompasses, which was issued on October 8, 1929, to present applicant.

Although for the purpose of explanation the leaf springs 14 have been described as normally in the vertical position so as to form with the masses a pair of linked inverted pendulums, it is to be understood that my invention is not limited to this particular arrangement of the springs. The point of attachment of the leaf spring to the rotor casing may be directly above, below or in some intermediate position relatively to the center of gravity of the mass which it supports. The maximum effect is obtained when the point of attachment is directly below the mass, but under certain conditions this may not be the ruling consideration. Also, although I prefer to use two masses for the sake of symmetry, I may use a single mass or any number of masses without departing from the essence of my invention.

Figs. 5 and 6 show an arrangement wherein the leaf spring 14 is set at an angle of 45° from the vertical, the mass 15 being at the top. This disposition as will be seen saves space in the north-south direction because the two masses are placed to the east of the center of the rotor where they are clear of the rotor bearings. With such an arrangement counterweights 30 should be fixed to the gyro casing on the west side.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyrocompass, the combination of a gyroscope having a rotor in a casing with its axle normally horizontal and spinning clockwise seen from the north side, and a mass or masses, spring centralizing means pivoting said mass on said casing in unstable equilibrium so that on inclination of the gyro axle, said masses are displaced relatively to said casing in a direction substantially parallel to the gyro axle and towards the lower end of the same by an amount approximately proportional to said inclination so as to exert a gravity couple round the horizontal diameter of the rotor for the purpose of making it north-seeking.

2. In a gyroscopic compass having a gyroscopic rotor and casing mounted in neutral equilibrium in a phantom ring, a mass or masses, a spring furnishing a pivot for said mass about an E-W axis on said casing in neutral equilibrium and capable of movement parallel to the gyro axle on any inclination of said axle, a viscous fluid damper adapted to damp the oscillations of said masses on their resilient support, means for damping the compass oscillations consisting of cooperating magnetic elements carried by the phantom ring and movable masses respectively, means for adjusting the stiffness of the spring supports of the masses according to the latitude, and means for temporarily de-energizing one of said damping magnets when required.

3. A gyroscopic compass having a phantom ring comprising in combination a rotor casing mounted in neutral equilibrium about an E-W axis, a mass or masses resiliently supported on said casing and capable of movement N-S relatively to said casing on any inclination of said casing, a viscous fluid damper adapted to damp the oscillations of said masses on their resilient support, and means for damping the compass oscillations consisting of cooperating magnets carried by the phantom ring and movable masses respectively.

4. A gyroscopic compass having a phantom ring and comprising in combination a rotor casing mounted in neutral equilibrium, a mass or masses resiliently supported on said casing and capable of movement relatively to said casing parallel to the gyro axle on any inclination of said axle, and means for damping the compass oscillations, said means consisting of cooperating magnets carried by the phantom ring and movable masses respectively.

5. In a gyrocompass mounted for oscillation about a horizontal axis, an inverted pendulum in the form of a leaf spring attached near its bottom to the gyroscope and having secured to the top thereof a mass so that the mass is supported in neutral equilibrium when the gyroscope is level, and whereby the mass is displaced towards the low side of the gyroscope upon tilt thereof about its horizontal axis to render the gyroscope top heavy.

6. In a gyrocompass mounted for oscillation about a horizontal axis, an inverted pendulum in the form of a leaf spring attached at its bottom to the gyroscope and having secured to the top thereof a mass so that the mass is supported in neutral equilibrium when the gyroscope is level, whereby the mass is displaced towards the low side of the gyroscope upon tilt thereof about its horizontal axis, and means for adjusting the effective length of that portion of the leaf spring connected to the mass according to the latitude.

7. In a gyrocompass mounted for oscillation about a horizontal axis, an inverted pendulum in the form of a leaf spring attached near its bottom to the gyroscope and having secured to the top thereof a mass so that the mass is supported in unstable equilibrium and whereby the mass is displaced towards the low side of the gyroscope upon tilt thereof about its horizontal axis, and a viscous damper acting between said mass and said gyroscope for delaying the movements of the mass sufficiently to reduce intercardinal rolling error.

8. In a gyrocompass mounted for oscillation about a horizontal axis, an inverted pendulum in the form of a leaf spring attached near its bottom to the gyroscope and having secured to the top thereof a mass so that the mass is supported in unstable equilibrium whereby the mass is displaced towards the lower side of the gyroscope upon tilt thereof about its horizontal axis, and a yielding coupling between said mass and said phantom ring in line with said horizontal axis, whereby upon the aforesaid displacement of the mass a torque is also exerted about the vertical axis of the gyroscope to damp its oscillation about the meridian.

9. In a gyrocompass mounted for oscillation about a horizontal axis, an inverted pendulum in the form of a leaf spring attached near its bottom to the gyroscope and having secured to the top thereof a mass so that the mass is supported in unstable equilibrium whereby the mass is displaced towards the low side of the gyroscope upon tilt thereof about its horizontal axis, a viscous damper acting between said mass and said gyroscope for delaying the movements of the mass sufficiently to reduce intercardinal rolling error, and cooperating magnetic means between said mass and said phantom ring in line with said horizontal axis, whereby upon the aforesaid displacement of the mass a torque is also exerted about the vertical axis of the gyroscope to damp its oscillation about the meridian, and means whereby said magnetic means may be deenergized during turns.

10. A gyroscopic compass having a phantom ring and comprising in combination a rotor casing mounted in neutral equilibrium, a mass resiliently supported on said casing so as to move relatively to said casing parallel to the gyro axle on any inclination of said axle, for imparting meridian seeking properties to the compass, and means for damping the compass oscillations, said means comprising cooperating magnetic means carried by the phantom ring and movable mass respectively, and means whereby said magnetic means may be temporarily deenergized to eliminate the damping error due to turns.

11. In a gyroscopic compass having a phantom ring, a vertical ring, a wire suspension supporting said vertical ring from said phantom ring and a rotor casing mounted in neutral equilibrium in said vertical ring for freedom about a horizontal axis, a mass resiliently supported on said casing so as to move relatively to said casing parallel to the rotor axle on any inclination of said axle about said horizontal axis for imparting meridian seeking properties to the compass, and means for damping the compass oscillations including mutually repelling magnetic members carried respectively by the phantom ring and movable mass normally in line with said horizontal axis, whereby upon relative displacement of the phantom and gyroscope in azimuth a slight torque is exerted about the vertical axis of the gyroscope in the direction opposing the centralizing action of the wire suspension.

12. A gyroscopic compass having a phantom ring comprising in combination a rotor casing mounted in neutral equilibrium for freedom about vertical and horizontal axes, a mass or masses resiliently supported on said casing and capable of movement relatively to said casing parallel to the rotor axle on any inclination of said axle, a viscous fluid damper adapted to damp the oscillations of said masses on their resilient support, and means for damping the compass oscillations consisting of mutually acting magnetic members carried by the phantom ring and movable mass respectively.

13. In a gyroscopic compass having a phantom ring mounted for orientation about a vertical axis, and a rotor casing pivoted therein in neutral equilibrium about an E-W axis, a mass pivotally supported on said casing by a resilient support for movement N-S relative to said casing on tilt of said casing, a viscous fluid damper adapted to damp the oscillations of said mass about its pivot, and cooperating magnets carried by the phantom ring and movable mass respectively for damping the compass oscillations, said magnets being so mounted as to be laterally displaced upon lateral movement of said mass due to tilt of said casing to exert a torque about the vertical axis of said casing in a direction to reduce the tilt.

LESLIE F. CARTER.

REFERENCES CITED

The following references are of record in the file of this patent:

UNITED STATES PATENTS

| Number | Name | Date |
| --- | --- | --- |
| 1,686,524 | Hight | Oct. 9, 1928 |
| 1,730,967 | Carter | Oct. 8, 1929 |
| 1,749,059 | Bassett | Mar. 4, 1930 |
| 1,773,412 | Thompson | Aug. 19, 1930 |
| 1,986,807 | Gillmor | Jan. 8, 1935 |